United States Patent [19]

Rau

[11] Patent Number: 5,031,873
[45] Date of Patent: Jul. 16, 1991

[54] VEHICULAR POWERTRAIN MOUNT ASSEMBLY

[75] Inventor: Thomas E. Rau, Dayton, Ohio
[73] Assignee: General Motors Corporation, Detroit, Mich.
[21] Appl. No.: 463,734
[22] Filed: Apr. 4, 1990

Related U.S. Application Data

[60] Division of Ser. No. 387,413, Jul. 31, 1989, which is a continuation of Ser. No. 197,948, May 24, 1988, abandoned.

[51] Int. Cl.$^5$ ............................................. F16M 13/00
[52] U.S. Cl. ..................................... 248/632; 248/634; 248/638; 29/897.2
[58] Field of Search ...................... 29/897.2, 450, 451; 156/313; 248/632, 633, 634, 638

[56] References Cited

U.S. PATENT DOCUMENTS

| | | | |
|---|---|---|---|
| 3,859,239 | 1/1975 | Van Gils | 525/119 |
| 4,311,204 | 1/1982 | Shupert | 180/54 |

Primary Examiner—P. W. Echols
Assistant Examiner—David P. Bryant
Attorney, Agent, or Firm—R. W. Tung

[57] ABSTRACT

A vehicular powertrain mount assembly comprising two metal bracket members and a volume of a resilient elastomeric material sandwiched between and adhesively bonded to the two brackets. An epoxy adhesive is used in bonding the metal to the elastomer producing a bond having a minimum tensile rupture strength of 3,000 Newtons when tested by ASTM D-429.

2 Claims, 1 Drawing Sheet

VEHICULAR POWERTRAIN MOUNT ASSEMBLY

This is a division of application Ser. No. 07/387,413, filed on July 31, 1989, which is a continuation of application of U.S. Ser. No. 197,948 filed May 24, 1988, which is being abandoned.

FIELD OF THE INVENTION

The present invention generally relates to a vehicular powertrain mount assembly comprising two bracket members and a volume of a resilient material sandwiched therein and, more particularly, is concerned with a vehicular powertrain mount assembly comprising two bracket members and a volume of a resilient material sandwiched between and adhesively bonded to the two brackets.

BACKGROUND OF THE INVENTION

A vehicular powertrain mount assembly is usually known as an engine mount, a transmission mount, or the like. When an internal combustion engine powers a motor vehicle, there are numerous vibrations set up such as jounce vibrations, fore and aft vibrations, and torque and torque reaction vibrations. It is a customary practice to isolate these vibrations from the passenger compartment by using resilient powertrain mounts. Powertrain mount assemblies are also used to support a powertrain member on a vehicular frame to provide for jounce and roll control of the powertrain member relative to the frame. In a conventional powertrain mount assembly, two or more bracket members are bonded to a volume of a resilient material by adhesive means. The bracket members are normally stamped cold-rolled steel parts which can be attached by mechanical means to either the powertrain member or the frame member of a vehicle. A typical resilient material used in a powertrain mount assembly is a rubber material capable of absorbing most of the vibration from the powertrain member and the jounce from the frame member such that they are sufficiently isolated from each other. The type of rubber materials normally used are natural rubber, styrene-butadiene rubber, ethylene-propylene-dienemonomer rubber, and any other suitable elastomeric materials.

The bonding of the rubber material to the metal bracket is ordinarily accomplished with a solvent-based adhesive that is applied to the metal prior to the rubber molding process and then co-vulcanized with the rubber during the cure cycle. This is frequently called an in-mold bonding process. Numerous problems are associated with the in-mold bonding process and its resulting product. A first problem is the costly rubber-removal operation. In a contemporary mount design with complicated rubber block shapes and interlocking structures, it is impossible to seal rubber from certain forbidden areas. Subsequent operations to remove the unwanted rubber are labor intensive. Moreover, a secondary phosphating operation is required to replace the phosphate coating. removed with the rubber flash.

Secondly, in an in-mold bonding process, metal brackets must first be placed in a mold cavity prior to the rubber vulcanization process. This greatly reduces the number of cavities allowed in a given mold size. The mold is frequently damaged from improperly positioned metal brackets. Furthermore, the mold cycle time of the mount assembly is increased because cold brackets must first be heated in the mold.

Thirdly, there is a significant amount of solvent emissions from the in-mold bonding process due to the solvent-based adhesive used. In most cases, the use of expensive recovery equipment is necessary to meet air pollution regulations.

It is therefore an object of the present invention to provide a powertrain mount assembly that can be bonded together after the rubber block is first vulcanized.

It is another object of the present invention to provide a post-vulcanization bonded powertrain mount assembly that can be bonded together by an inexpensive process suitable for use in a production environment.

It is yet another object of the present invention to provide a post-vulcanization bonded powertrain mount assembly comprising two bracket members and a volume of a rubber material sandwiched between and bonded to the two brackets by an epoxy adhesive.

SUMMARY OF THE INVENTION

My novel invention is a powertrain mount assembly comprising two bracket members and a volume of a rubber material sandwiched therein and bonded to the brackets by an epoxy adhesive. The rubber material is vulcanized prior to the bonding process. The epoxy adhesive can be cured slowly at room temperature or can be cured quickly at elevated temperatures. The epoxy adhesive allows the use of a very low bonding pressure applied on the metal brackets during the adhesive cure cycle. This is a great process advantage in that no bulky fixtures are required for the bonding process and furthermore, deformation of the rubber material can be avoided. My novel post-vulcanization bonded powertrain mount assembly can be cured at a lower temperature and in a shorter time than the conventional solvent-based adhesive bonded mount assembly. My post-vulcanization bonded powertrain mount assembly can be manufactured with essentially no deformation in the rubber block resulting in a more consistent product. More design freedom in the rubber block shapes in my post-vulcanization bonded mount assembly is achieved since more complicated shapes of rubber blocks can now be used.

I have further discovered that the use of an epoxy adhesive between rubber and metal in a powertrain assembly, i.e. a dynamic loading application, taught by the present invention produces a greatly unexpected result. I use the words "dynamic loading application" to describe applications in which the loading on the part is of a dynamic or a consistently changing nature instead of a static load which does not change. All powertrain mounts previously have been bonded with solvent based rubber adhesives.

To someone skilled in the art in making powertrain mounts it would have been obvious that, in order to survive a dynamic loading condition, the adhesive joint itself must remain flexible and thus producing an impact resistant joint interface between rubber and metal. The adhesive joint produced by an epoxy adhesive is by no means flexible; instead, it is a very rigid joint. It is, therefore, entirely unexpected to the inventor that a rigid adhesive joint produced by an epoxy adhesive could survive in a dynamic loading application.

This greatly unexpected result is further supported by Anderson, U.S. Pat. No. 4,198,037 in that, in his dynamic loading application, he concluded that no commercially available adhesive system could produce an acceptable adhesive bond in his elastomer compression spring. The only method Anderson found possible for bonding polyester elastomer to metal plates was to cause the elastomer to flow into the apertures in the plates forming a mechanical lock.

DESCRIPTION OF THE DRAWINGS

Other objects, features and advantages of the present invention will become apparent upon consideration of the specification and the appended drawings in which.

DESCRIPTION OF THE PREFERRED EMBODIMENT

My novel invention is a vehicular powertrain mount assembly comprising two bracket members and a volume of a rubber material sandwiched therein and bonded to the brackets by an epoxy adhesive. I have discovered that by bonding a vulcanized rubber block to metal brackets using an epoxy adhesive resulted in a powertrain mount assembly having superior properties and processing advantages.

Figure 1:
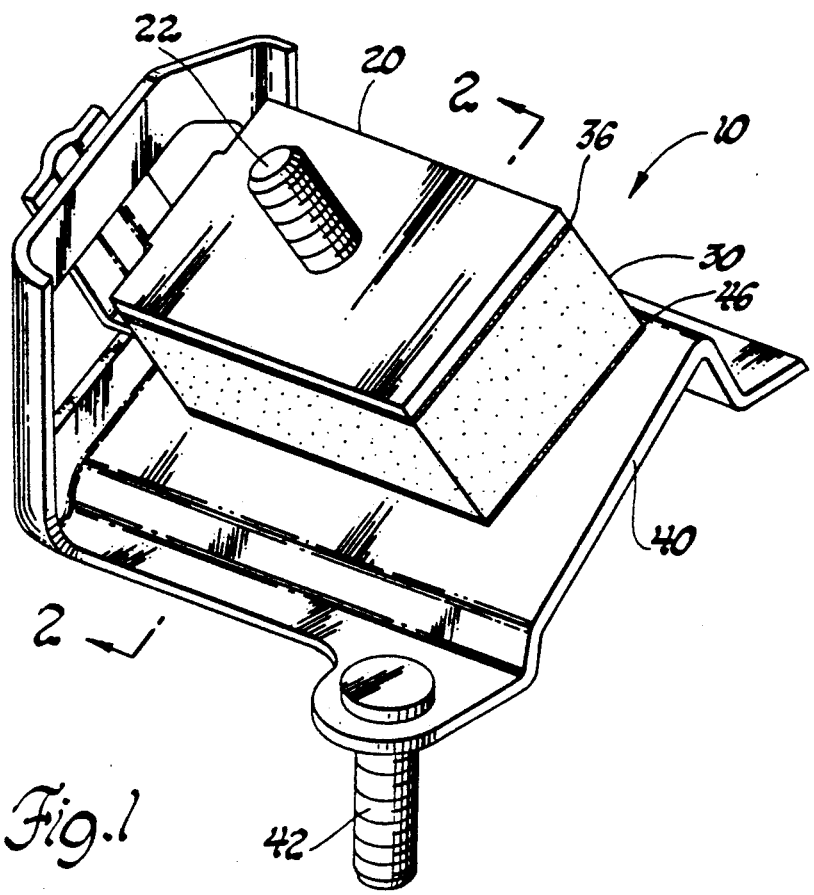
FIG. 1 is a perspective view showing a powertrain mount assembly.
Figure 2:
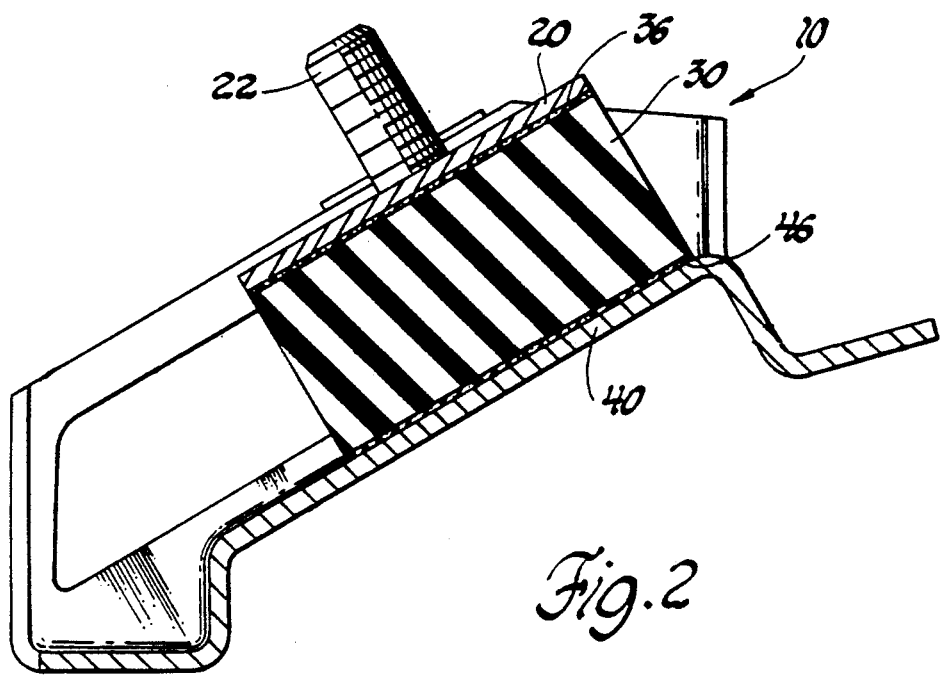
FIG. 2 is a cross sectional view taken along 2—2 in FIG. 1 showing the two joint interfaces between the rubber block and the two metal brackets.

Referring initially to FIG. 1, where a typical engine mount assembly 10 is shown. A first metal bracket member 20 and a second metal bracket member 40 are bonded to a volume of rubber material 30 by adhesive means. The adhesive used in our preferred embodiment is a two-part epoxy adhesive shown in FIG. 2 at joint interface 26 and 46. Mechanical means for securing engine mount assembly 10 to an engine (not shown) and a vehicular frame member (not shown) are shown at 22 and 42 in FIG. 1.

In our assembly process, a volume of a rubber material (commonly known as a rubber block) is first compression molded in a press. A mold release is used which does not leave any residue on the rubber surface. I have successfully used rubber material such as natural rubber and ethylene-propylene-diene-monomer rubber for my powertrain mount assemblies. Other suitable rubber materials such as styrene-butadiene rubber, nitrile rubber, or the like, works equally well in my mount assemblies. I have used a silicone type mold release material which can be sprayed and cured on the mold surface. The rubber block surface to be bonded is normally primed with a material that makes it compatible with epoxy adhesives. For natural rubber, I have found a primer under the tradename of Chemlok ® 7701 supplied by the Lord Corporation worked very well. Chemlok ® 7701 is a solution of an organic acid which can be sprayed or brushed on the rubber surface and then dried at room temperature for five minutes.

The epoxy adhesive I used is a two-part structural grade epoxy adhesive supplied by the Lord Corporation under the tradename of Fusor ® 320 resin and Fusor ® 310B hardener. A structural grade adhesive is one that can be used in applications where there are high stress loading conditions. The mix ratio I have used is ten parts resin to five parts hardener which resulted in a higher softening temperature than that specified by the manufacturer after cure. Fusor ® 320 resin is a bisphenol-A type epoxy resin having a viscosity between 250,000 to 1,000,000 CPS as determined by a Brookfield viscometer at 25° C. with T-Bar-C at 5 RPM. It has a density (weight per gallon) between 11.7 to 12.7 oz. The Fusor ® 310B hardener is a mixture of a polyamide resin (60 to 70%), an aliphatic amine (2–7%), and aluminum powder (15–20%). It has a viscosity between 200,000 to 450,000 CPS as determined by the Brookfield viscometer at 25° C. with T-Bar-C at 5 RPM. It has a density (weight per gallon) between 10.1 to 10.5 oz.

I have used other types of structural adhesives that worked equally well in my novel invention. These include Epoxy Patch ® 9340 supplied by the Hysol Division of Dexter Corporation, Epon ® 828 resin supplied by the Shell Corporation cured by Versamid ® 140 supplied by the General Mills Corporation. Other non-epoxy type structural adhesives such as polyurethane base adhesives may work equally well. One of such adhesives I have used successfully is Tyrite ® 7500A and Tyrite ® 7510B supplied by the Lord Corporation.

After Fusor ® 320 and Fusor ® 310B are mixed together, it has a shelf life between 20 to 30 minutes. Within this time, the adhesive is applied to either the rubber surface or the metal bracket surface. After the rubber block and the metal brackets are put together, a low pressure (less than 5 PSI) is applied to the assembly normal to the bond planes. The pressure should be sufficient to spread the adhesive in the joint interface and extrude a small amount from the edges. The powertrain assembly under pressure is then subjected to a heating medium such as hot air or infrared such that the bondline temperature reaches 250° F. for one minute. It can also be cured at room temperature in approximately 24 hours. After the adhesive is cured, the bonded powertrain assembly is removed from the fixture and ready for packaging and shipment.

My novel powertrain mount assembly bonded by an epoxy adhesive can be assembled easily and can be used at continuous service temperature as high as 220° F. It has passed a vehicular service test at 220° F. for six days under maximum engine load conditions.

My post-vulcanization bonding process produces powertrain mount assembly having superior tensile rupture strength when compared to those bonded by the conventional in-mold bonding technique. I have conducted laboratory adhesion tests performed in accordance with the American Society of Testing and Materials (ASTM) test D-429 (method A). In this test, rubber is bonded between two parallel metal discs that are one inch in diameter. The two metal discs are then pulled apart in a tensile testing machine to determine the tensile rupture strength of the bond.

For comparison, I have tested several commercial adhesives used in both the conventional in-mold bonding method and my novel post-vulcanization bonding method.

TABLE 1

| TENSILE RUPTURE STRENGTH, NEWTONS | | |
|---|---|---|
| SAMPLE | IN-MOLD BONDING | POST-VULCANIZATION BONDING |
| Chemlok ® 236 | 1,378 | 1,150 |
| Chemlok ® 238 | 1,356 | — |
| Thixon ® OSN-2 | 1,751 | — |
| Chemlok ® TS3604-72 | 3,370 | — |
| Fusor ® 320/310B | — | 3,846 |

Chemlok ® adhesives are supplied by the Lord Corporation. Thixon ® adhesives are supplied by the Dayton Chemical Company. In Thixon ® OSN-2 bonded samples, the bond strength or the tensile rupture strength of the bond is lower than usual since the samples tested were prepared with metal discs that were not phosphated.

samples, the bond strength or the tensile rupture strength of the bond is lower than usual since the samples tested were prepared with metal discs that were not phosphated.

It is seen from Table 1 that epoxy post-vulcanization bonded samples (Fusor® 320/310B) showed higher bond strengths than all the other samples bonded with solvent-based rubber adhesives. It pulled approximately 15% higher than the best of the four adhesives tested with conventional in-mold bonded techniques, and also showed about 300% better strength than the samples post-vulcanization bonded by the conventional solvent-based rubber adhesive.

I have found that with epoxy post-vulcanization bonded samples, the tensile rupture strength obtained in ASTM D-429 test was consistently over 3,000 Newtons. Even though in-mold bonded Chemlok® TS3604-72 test samples also show an average tensile rupture strength of over 3,000 Newtons, many individual test samples were tested at strength values of under 3,000 Newtons. It is therefore my conclusion that only epoxy post-vulcanization bonded samples consistently show an improved bond strength in powertrain mounts.

While my invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A vehicular mount assembly for resiliently supporting a powertrain member on a frame member in a motor vehicle comprising:
    a first bracket member;
    means for securing said first bracket member to said powertrain member,
    a second bracket member,
    means for securing said second bracket member to said frame member,
    a volume of a vulcanized elastomeric material having a first and a second surface sandwiched between said first and said second bracket member,
    a layer of a non-water-based thermoset adhesive between said first bondable surface of said elastomeric material and said first bracket member, and
    a layer of a non-water-based thermoset adhesive between said second bondable surface of said elastomeric material and said second bracket member.

2. A vehicular mount assembly for resiliently supporting a powertrain member on a frame member in a motor vehicle comprising:
    a first bracket member,
    means for securing said first bracket member to said powertrain member,
    a second bracket member,
    means for securing said second bracket member to said frame member,
    a volume of a vulcanized elastomeric material having a first and a second surface sandwiched between said first and said second bracket member,
    a layer of a non-water-based thermoset adhesive between said first bondable surface of said elastomeric material and said first bracket member, and
    a layer of a non-water-based thermoset adhesive between said second bondable surface of said elastomeric material and said second bracket member,
    said layers of non-water-based thermoset adhesive having a sufficient bond strength capable of surviving a continuous vehicular service temperature of 220° F.

* * * * *